United States Patent
Berger

(10) Patent No.: US 11,153,187 B2
(45) Date of Patent: Oct. 19, 2021

(54) MEASURING SYSTEM AND MEASURING METHOD FOR MEASURING INTERACTIVITY

(71) Applicant: Rohde & Schwarz GmbH & Co. KG, Munich (DE)

(72) Inventor: Jens Berger, Zuchwill (CH)

(73) Assignee: Rohde & Schwarz GmbH & Co. KG, Munich (DE)

( * ) Notice: Subject to any disclaimer, the term of this patent is extended or adjusted under 35 U.S.C. 154(b) by 36 days.

(21) Appl. No.: 16/698,090

(22) Filed: Nov. 27, 2019

(65) Prior Publication Data

US 2020/0382398 A1    Dec. 3, 2020

(30) Foreign Application Priority Data

May 29, 2019 (EP) .................................. 19177153

(51) Int. Cl.
*H04L 12/26* (2006.01)
*H04L 12/841* (2013.01)

(52) U.S. Cl.
CPC ...... *H04L 43/0852* (2013.01); *H04L 43/0829* (2013.01); *H04L 43/106* (2013.01); *H04L 47/283* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,466,986 B2 * | 12/2008 | Halcrow | ............... | H04W 48/16 455/456.1 |
| 2015/0306498 A1 * | 10/2015 | Tornqvist | ............... | A63F 13/814 463/36 |
| 2017/0339584 A1 * | 11/2017 | Ketonen | ............... | H04W 24/04 |
| 2018/0316586 A1 | 11/2018 | Hansson et al. | | |
| 2020/0057555 A1 * | 2/2020 | Walkin | ............... | G06F 3/04817 |
| 2020/0059428 A1 * | 2/2020 | Nadeau | ............... | H04L 43/0888 |

* cited by examiner

*Primary Examiner* — Xavier S Wong
(74) *Attorney, Agent, or Firm* — Ditthavong, Steiner & Mlotkowski

(57) ABSTRACT

A measuring system comprises a first measuring device and a second measuring device. The first measuring device comprises a measuring unit, which is configured to successively transmit at least one first data packet to the second measuring device. The second measuring device is configured to attempt to receive the at least one first data packet and to, for each received first data packet, and to respond by transmitting a second data packet to the first measuring device. The measuring unit is moreover configured to attempt to receive the at least one second data packet and to determine a latency between transmitting the at least one first data packet and receiving the at least one second data packet. The first measuring device moreover comprises an interactivity calculator, which is configured to calculate an interactivity score based on the determined latency.

11 Claims, 14 Drawing Sheets

MEASURING SYSTEM AND MEASURING METHOD FOR MEASURING INTERACTIVITY

PRIORITY

This application claims priority of European patent application EP 19 177 153.4 filed on May 29, 2019, which is incorporated by reference herewith.

FIELD OF THE INVENTION

The invention relates to measuring parameters of a communications connection, and determining the interactivity of the connection therefrom. Especially, the invention relates to a telepresence or remote control or online gaming environment.

BACKGROUND OF THE INVENTION

In applications like telepresence, remote control or online gaming, a short latency, a low latency jitter and a low packet loss rate are relevant factors. These parameters specify the performance of the communications connection. The influence of these technical measures on the qualitative perception for different applications though is not linear with regard to the technical measurement units described before. For example, US 2018/0316586 A1 shows such a conventional latency measuring system.

Accordingly, there is a need to provide a measuring system and method which allow for determining the perceived interactivity of a communications connection.

SUMMARY OF THE INVENTION

An inventive measuring system comprises a first measuring device and a second measuring device. The first measuring device comprises a measuring unit, which is configured to successively transmit at least one first data packet to the second measuring device. The second measuring device is configured to attempt to receive the at least one first data packet and to, for each received first data packet, respond by transmitting a second data packet to the first measuring device. The measuring unit is preferably configured to attempt to receive the at least one second data packet and to determine a latency between transmitting the at least one first data packet and receiving the at least one second data packet. The first measuring device moreover comprises an interactivity calculator, which is configured to calculate an interactivity score based on the determined latency. This allows for providing a human-perception-oriented measure of the fitness of the measured communications connection for interactive applications.

Advantageously, the interactivity calculator is configured to calculate the interactivity score as the determined latency. This allows for an especially simple calculation.

Alternatively and preferably, the interactivity calculator is preferably configured to calculate the interactivity score by a linear perception function based on the determined latency or by a non-linear perception function based on the determined latency. This allows for a significant increase in accuracy.

Preferably, the measuring unit is moreover configured to successively transmit a plurality of first data packets to the second measuring device. The second measuring device is then configured to attempt to receive the plurality of first data packets. The measuring unit is configured to attempt to receive the plurality of second data packets, sent out by the second measuring device in reaction to the plurality of first data packets, and to determine the latency between transmitting each of the plurality of first data packets and receiving each corresponding second data packet of the plurality of second data packets. The interactivity calculator is then configured to calculate the interactivity score based on the determined latencies. This allows for determining the interactivity score over time, allowing for an increased accuracy of the measurement.

Advantageously and preferably, the measuring unit is configured to send the first data packets at a data packet frequency. The data packet frequency is pre-defined or user-selectable. This allows for adapting the measurement to the capabilities of the communications connection.

Advantageously and preferably, the interactivity calculator is moreover configured to calculate the interactivity score additionally based on a jitter of the determined latency and/or based on a data packet loss rate determined by the interactivity calculator as a ratio of transmitted first data packets not resulting in a reception of a corresponding second data packet. This allows for a further increase of the accuracy of the interactivity score.

Preferably, the first measuring device moreover comprises a display. It is then configured to display the interactivity score on the display. This allows for a very simple operation of the measuring system.

Advantageously, the first measuring device is configured to display the interactivity score as a distance between a first symbol and a second symbol on the display. This allows for a very intuitive perception of the interactivity by a user.

Preferably, the first measuring device is moreover configured to display the second symbol in a color dependent upon the interactivity score. This further improves the intuitiveness of perceiving the interactivity score by the user.

If the measuring device successively transmits a plurality of first data packets to the second measuring and receives a plurality of second packets from the second measuring device, the first measuring device is preferably configured to update the distance between the first symbol and the second symbol on the display after each transmission of a first data packet and/or after each reception of a second data packet. This allows for the user to judge the interactivity over time.

Preferably, the first measuring device is configured to display the first symbol and the second symbol moving by a movement distance along a movement path over the display at each update of the distance. This display type simulates the effect of the communications connection on an interactive application and thereby gives the user a very intuitive grasp of the quality of the communications connection.

Preferably, the movement distance is pre-set or user-selectable. Additionally or alternatively, the movement path is pre-set or user-selectable or directly user-controllable. This allows for an especially flexible adaptation of the simulation with regard to different interactive applications to be simulated.

Advantageously and preferably, if the measuring system calculates the interactivity based upon the jitter and/or packet loss rate, the first measuring device is configured to display the second symbol at a size, dependent upon the jitter of the determined latency and/or display the second symbol with a blurriness, dependent upon the jitter of the determined latency and/or display the second symbol with a transparency, dependent upon the data packet loss rate and/or display the second symbol with a color dependent upon the data packet loss rate. This allows for an especially intuitive grasp of the quality of the communications connection by the user.

An inventive measuring method comprises transmitting, by a first measuring device, at least one first data packet to a second measuring device, attempting to receive the at least one first data packet, by the second measuring device, responding by transmitting a second data packet to the first measuring device, by the second measuring device, attempting to receive the at least one second data packet by the first measuring device, determining a latency between transmitting the at least one first data packet and receiving the at least one second data packet, by the first measuring device, and calculating an interactivity score based on the determined latency, by the first measuring device.

This allows for providing a human-perception-oriented measure of the fitness of the measured communications connection for interactive applications.

An inventive computer program comprises program code for performing the before-mentioned method when the computer program runs on a computer or a digital signal processor

BRIEF DESCRIPTION OF THE DRAWINGS

Exemplary non-limiting embodiments of the invention are now further explained in respect to the drawings, in which.

DETAILED DESCRIPTION OF PREFERRED EMBODIMENTS

Figure 1:
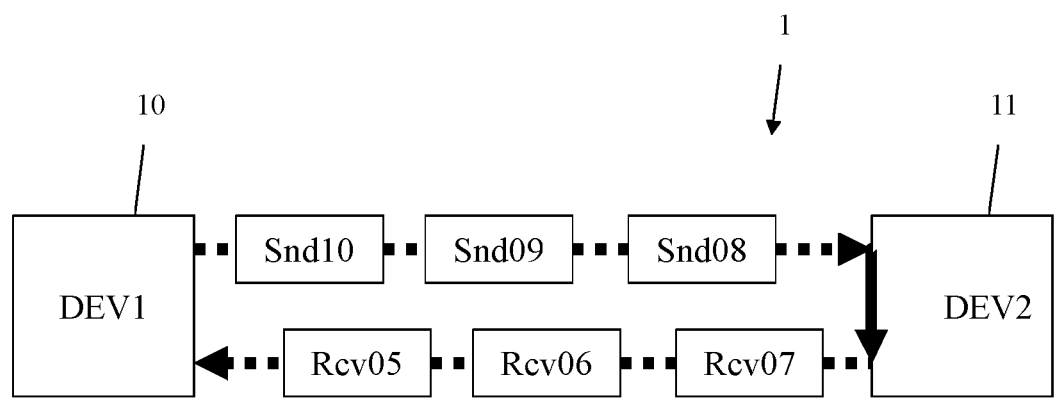
FIG. 1 shows a first embodiment of the communications system.

First we demonstrate the general operations of the measuring system along FIG. 1. With regard to FIG. 2-FIG. 3, the function and construction of alternative embodiments of the measuring system are shown. With regard to FIG. 4, the inner construction of one of the measuring devices of an embodiment of the measuring system is shown. With regard to FIG. 5-FIG. 14, the display of the interactivity score by different embodiments of the measuring system are shown and described. Finally, with regard to FIG. 15, the function of an embodiment of the measuring method is shown and described. Similar entities and reference numbers in different figures have been partially omitted.

In FIG. 1, a first embodiment of the measuring system 1 is shown. The measuring system 1 comprises a first measuring device 10 and a second measuring device 11. The first measuring device 10 and the second measuring device 11 are connected by a communications channel. The first measuring device 10 transmits a number of first data packets Snd10, Snd09, Snd08 to the second measuring device 11. The second measuring device 11 attempts to receive the first data packets Snd10-Snd08. For each received data packet Snd10-Snd08, the second measuring device responds by returning a second data packet Rcv07, Rcv06, Rcv05 to the first measuring device 10. Depending upon the data packet length, data packet separation and transmission time, an overlap of the first data packets Snd10-Snd08 and the second data packets Rcv07-Rcv05 can occur. For long data packet separations, short data packet lengths and short transmission time, no packet overlap is to be expected. Packet overlap though is no problem for the measuring system 1.

When transmitting a first data packet Snd10-Snd08, the first measuring device 10 records a timestamp, when the respective first measuring packet Snd10-Snd08 has been transmitted. When receiving the corresponding second data packet Rcv07-Rcv05, which has been sent as response to the first data packet Snd10-Snd08, the first measuring device 10 again records the timestamp of the respective packet. The first measuring device 10 then determines the latency as the time difference between the timestamps. It is important to note that the latency is preferably calculated as the time from the timestamp of transmitting a specific first data packet until the timestamp of receiving the second data packet, which has been transmitted by the second measuring device 11, in reaction to receiving the respective first data packet.

From this latency then, the first measuring device 10 calculates the interactivity score, which may later on be displayed. With regard to the calculation of the interactivity score, it is referred to the elaborations with regard to FIG. 4. With regard to the display, it is referred to the elaborations with regard to FIGS. 5-13.

Figure 2:
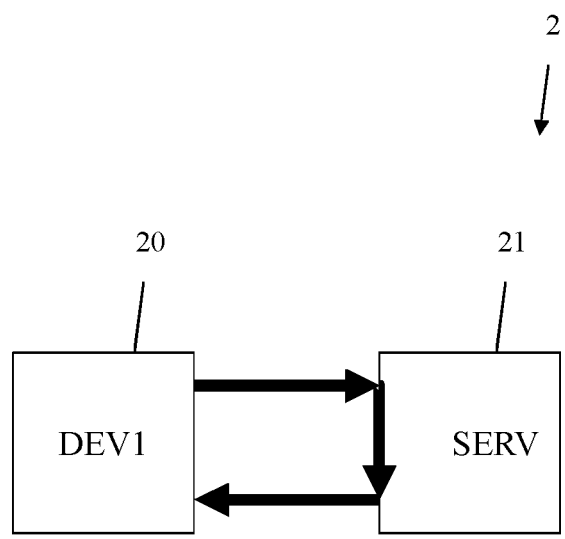
FIG. 2 shows a second embodiment of the communications system.

In FIG. 2, an alternative embodiment of the measuring system 2 is shown. Here, a first measuring device 20, for example a mobile telephone or a tablet or a personal computer is connected to a second measuring device 21, for example a server, especially a telepresence server or an online gaming server.

Figure 3:
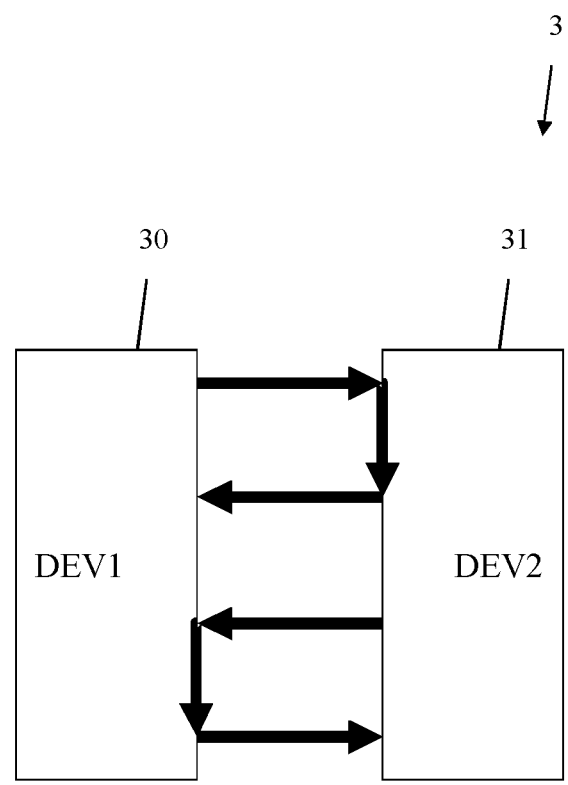
FIG. 3 shows a third embodiment of the communications system.

In FIG. 3, a further embodiment of the measuring system 3 is shown. Here, a bi-directional measurement is shown. A first measuring device 30 is connected to a second measuring device 31. The arrows in the top part of the figure correspond to the measuring direction as described in FIG. 1. The arrows in the lower part of the figure show a reverse measuring direction. Here, the second measuring device 31 transmits data packets to the first measuring device 30, which reacts by sending response data packets to the second measuring device 31. Here, the second measuring device 31 additionally determines an interactivity score from the latency of these packets. Both measuring devices 30 and 31 therefore independently determine their own interactivity score of the communications connection. By exchanging these interactivity scores, both devices thereby gain even more information regarding the interactivity of the communications connection.

Figure 4:
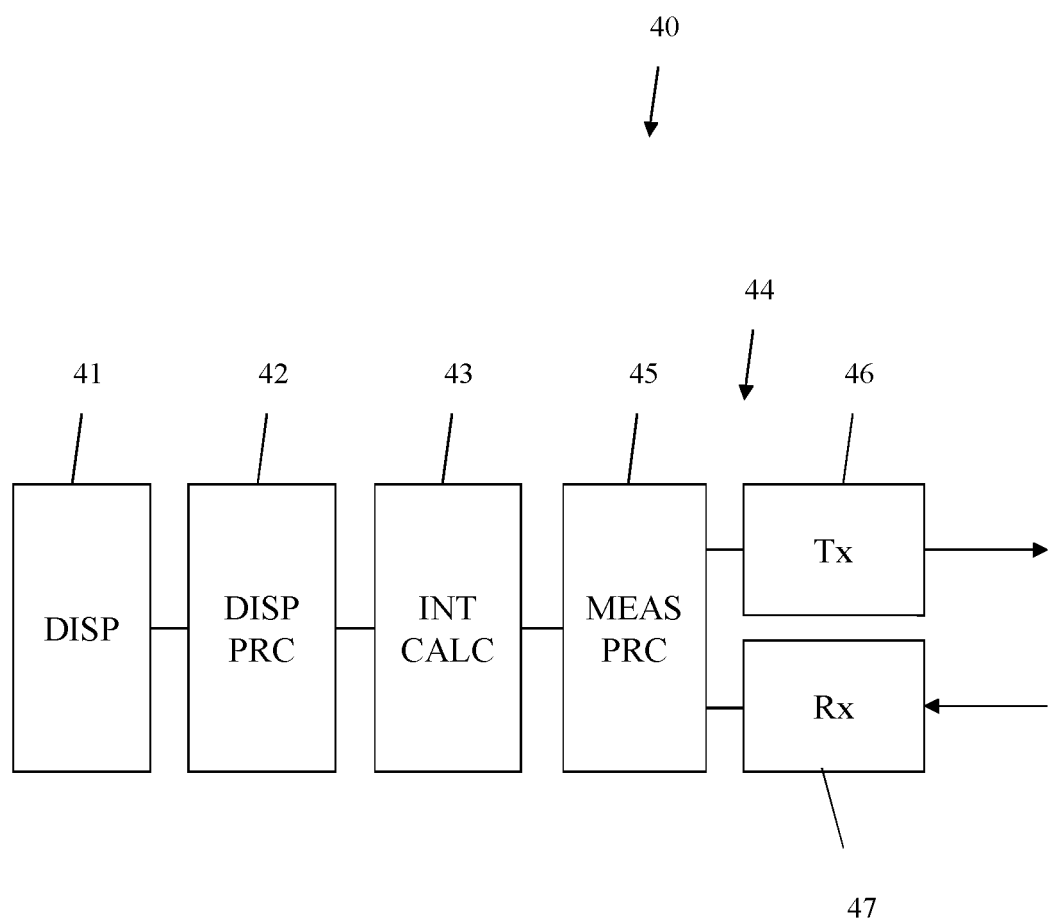
FIG. 4 shows a detail of a fourth embodiment of the communications system.

In FIG. 4, the inner construction of a measuring device 40, which corresponds to any of the previously described measuring device is shown. The measuring device 40 comprises a display 41, connected to a display processor 42, which is in turn connected to an interactivity calculator 43, which is connected to a measuring unit 44, which is comprised of a measuring processor 45 connected to the interactivity calculator 43 and a transmitter 46, connected to the measuring processor 45 and a receiver 47, also connected to the measuring processor 45. The transmitter 46 and the receiver 47 are connected to the communications connection and thereby to the second measuring device.

When performing a measurement, the measuring processor 45 generates a first data packet, which is handed to the transmitter 46 for transmission to the second measuring device. A second data packet is received by the receiver 47 from the second measuring device. The second data packet is handed on to the measuring processor 45. The measuring processor 45 compares the timestamps of the first measuring packet and the second measuring packet and therefrom determines the latency.

Optionally, the measuring processor 45 does not only handle a single first data packet and a single second data packet but can handle a series of first and second data packets. The measuring processor 45 then determines the latency of each of the data packet pairs consisting of a first data packet and a corresponding second data packet. From this plurality of latency values, the measuring processor 45 in this optional embodiment calculates a jitter of the latency.

Moreover, if not all of the first data packets being transmitted actually lead to a reception of a second data packet, a packet loss rate can be calculated by the measuring processor 45, optionally.

The latency, and optionally the jitter and the data packet loss rate, are handed on to the interactivity calculator 43, which calculates an interactivity score therefrom. This interactivity score is then handed on to the display processor 42, which therefrom generates an image to be displayed, which is then handed on to the display 41 and displayed.

The interactivity score may be calculated as follows:

A time distance $L_E(tr)=t_r-t_s$ of the transmitted first data packet and the received corresponding second data packet delivers the present value of the latency, for this specific data packet pair, $t_r$ being the time at which the second packet is received, and $t_s$ being the time at which the first packet is transmitted.

The perceived interactivity though is not only influenced by the present value of latency, but also by further influence factors:
  mean latency
  jitter (variance) of the latency, especially jitter of the present value of the latency
  data packet loss rate A possible function for determining the perceived interactivity, is in the most simple case a falling linear function of the present value of the latency, which corresponds to the round-trip-time of a first data packet and the corresponding second data packet.

As shown before, $L_E(t_r)$ is the present value of latency, at the time $t_r$, Max is a maximum value of the interactivity score, e.g. 100. v is a simulated activity level of the application.

The interactivity score is then $$I(t_r)=-v*L_E(t_r)+\text{Max}=-v(t_r-ts)+\text{Max}$$

Formulated even more generally the interactivity score is then $$I(t_r)=f(L_E(t_r))=f(t_r-ts)$$

The simulated activity level v can be displayed in the visualization as a constant movement of respective symbols on the display. The activity level v corresponds to the movement speed on the display. This is further described along FIGS. 8-14.

The perception of latency—as of a great deal of technical values—is not linear, but can be approximated at best using a non-linear function, in this case a falling Sigmoid function.

In a region of very small latency, as well as in a region of very large latency, the perception is less differentiated as in a region of medium latency, in which the sensitivity is increased.

When $L_E(t_r)$ is the present value of the latency, Max ist the maximum value of the interactivity score, e.g. 100, $b_g$ is a value for adjusting a transfer function to the latency axis (here, x-axis), v the simulated activity level of the application, $b_u$ an upper saturation level and $b_l$ a lower saturation level, then the interactivity score is then $$L_E(t_r) = \text{Max} - \frac{\text{Max } b_u}{b_u + b_l e^{(v(tr-ts-bg))}}$$

In the formulas so far, the interactivity was given by only one parameter, the latency. The interactivity though can also be calculated by aggregating or averaging over a time period. Since the time instances of transmitting and receiving are discrete values and the non-linearity is already mapped by the present values, a simple arithmetic averaging of the present values $L_E(t_r)$ for all N present values in an observation period can be used as average latency:

$$\overline{L_E} = \frac{1}{N}\sum^{t_r} L_E(t_r)$$

The jitter, which is the variance of the present values of the latency can also be included in the interactivity score. A basis is the standard deviation of the present values $\sigma_{LE}$ during the observation period.

Jitter may be visualized by a changed depiction of symbol borders. For example, for an increased latency jitter, the symbol borders may be displayed blurry, which is perceived by a user as less accurate and results in a perception of a reduced interactivity.

Also a packet loss rate can influence the interactivity score. Lost packets reduce the interactivity of the application significantly.

An increased packet loss rate may be visualized by a colored transparent depiction of the symbol or a dashed line depiction.

The interactivity score can then be calculated from three distinct terms, which are combined multiplicatively. The averaged present value of the latency is multiplied by reciprocal values of the jitter and packet loss rate.

$$I(t_r)=f(L_E(t_r))*(c_1/v\sigma_{LE})*(c_2/vP_L),$$

wherein $P_L$ is the packet loss rate, $c_1$ is a constant factor multiplied with jitter, $c_2$ is a constant value multiplied with the packet loss rate. $c_1$ and $c_2$ are weighting factors.

Written more generally:

$$I(t_r) = f_1(L_E, t) * f_2(\sigma_{LE}, v, t) * f_3(P_L, v, t),$$

wherein $f_1$ is a function of latency, $f_2$ is a function of jitter, and $f_3$ is a function of packet loss rate.

In order to differentiate between burst-type packet loss and constant packet loss, shown by different values of the density functions of the individual parameters $L_E$, $\sigma_{LE}$ and $P_L$ in the observation period, the weighting factors can be adjusted accordingly.

Figure 5:
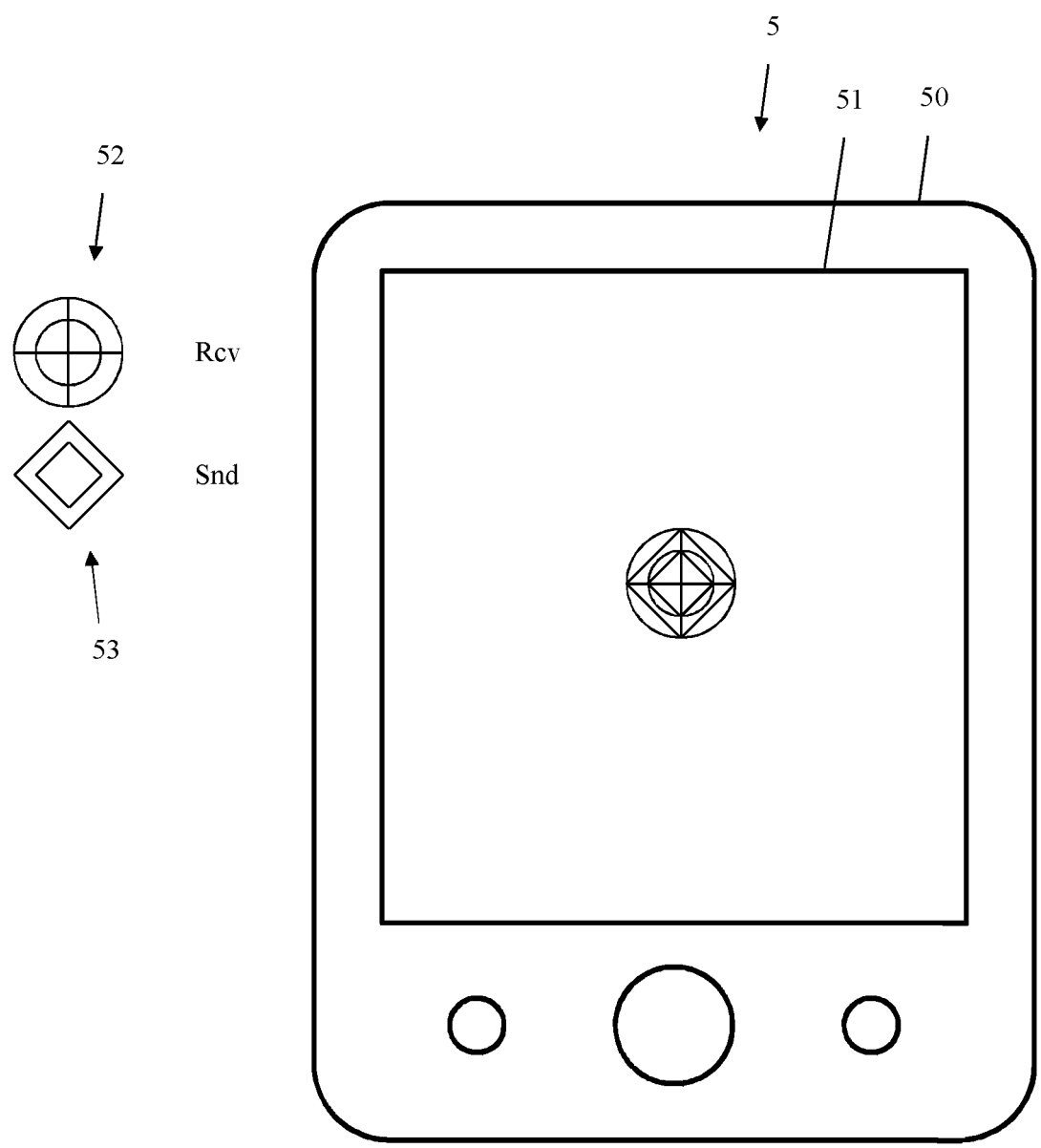
FIG. 5 shows a detail of a fifth embodiment of the communications system.

In FIG. 5, a further embodiment of the measuring system 5 comprising a first measuring device 50 is shown. The measuring device 50 comprises a display 51. On the display 51, the interactivity score is displayed as a distance of a first symbol 52, corresponding to the received second data packet, and a second symbol 53, corresponding to a first transmitted data packet. In the example shown here, the interactivity score is very high, leading to the symbols 52, 53 being shown at almost the same position.

Figure 6:
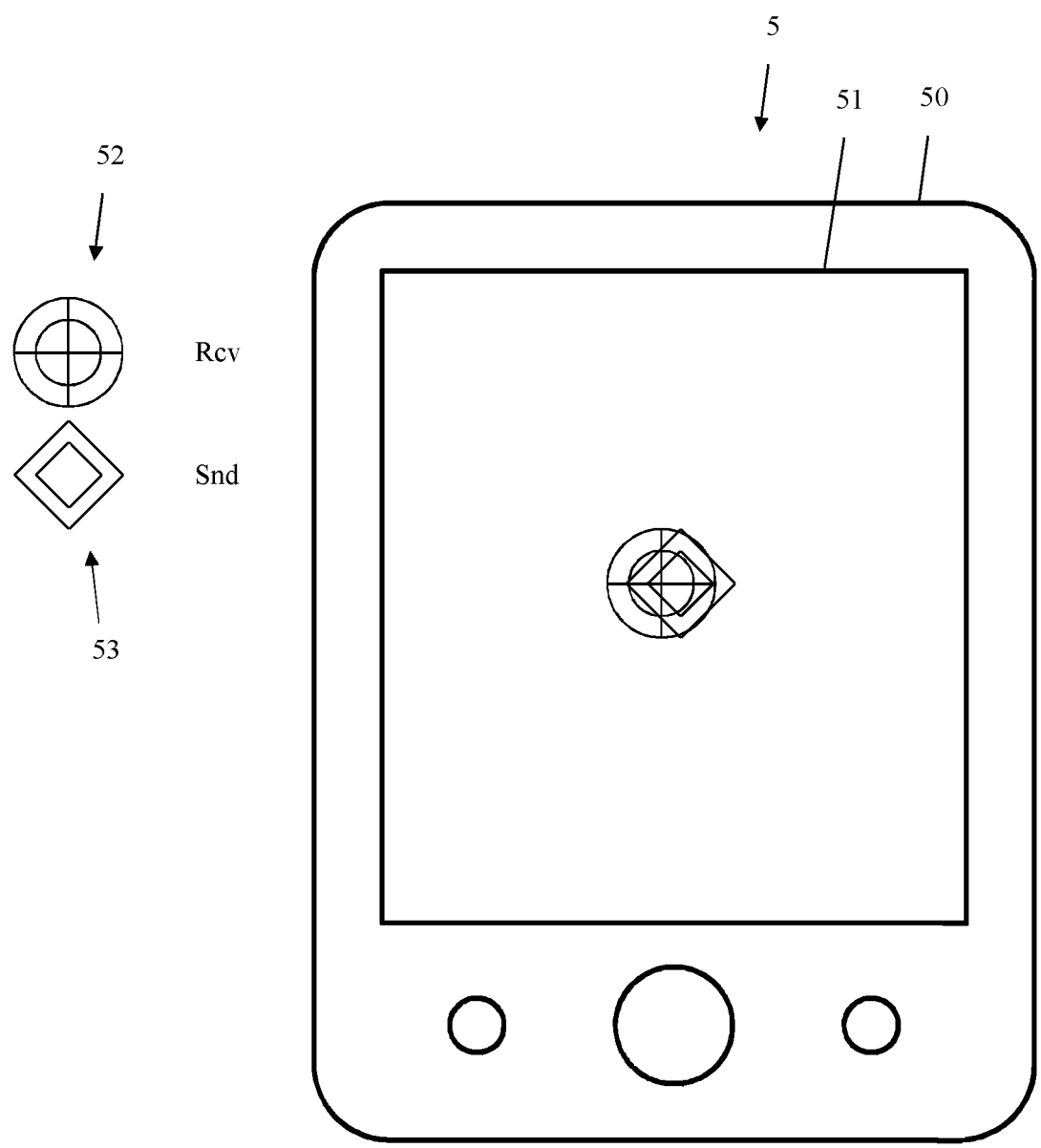
FIG. 6 shows a detail of a sixth embodiment of the communications system.

In FIG. 6, a slightly worse interactivity score is shown. Here, the first symbol 52 and the second symbol 53 are displayed slightly side by side, showing a sub-optimal interactivity score.

Figure 7:
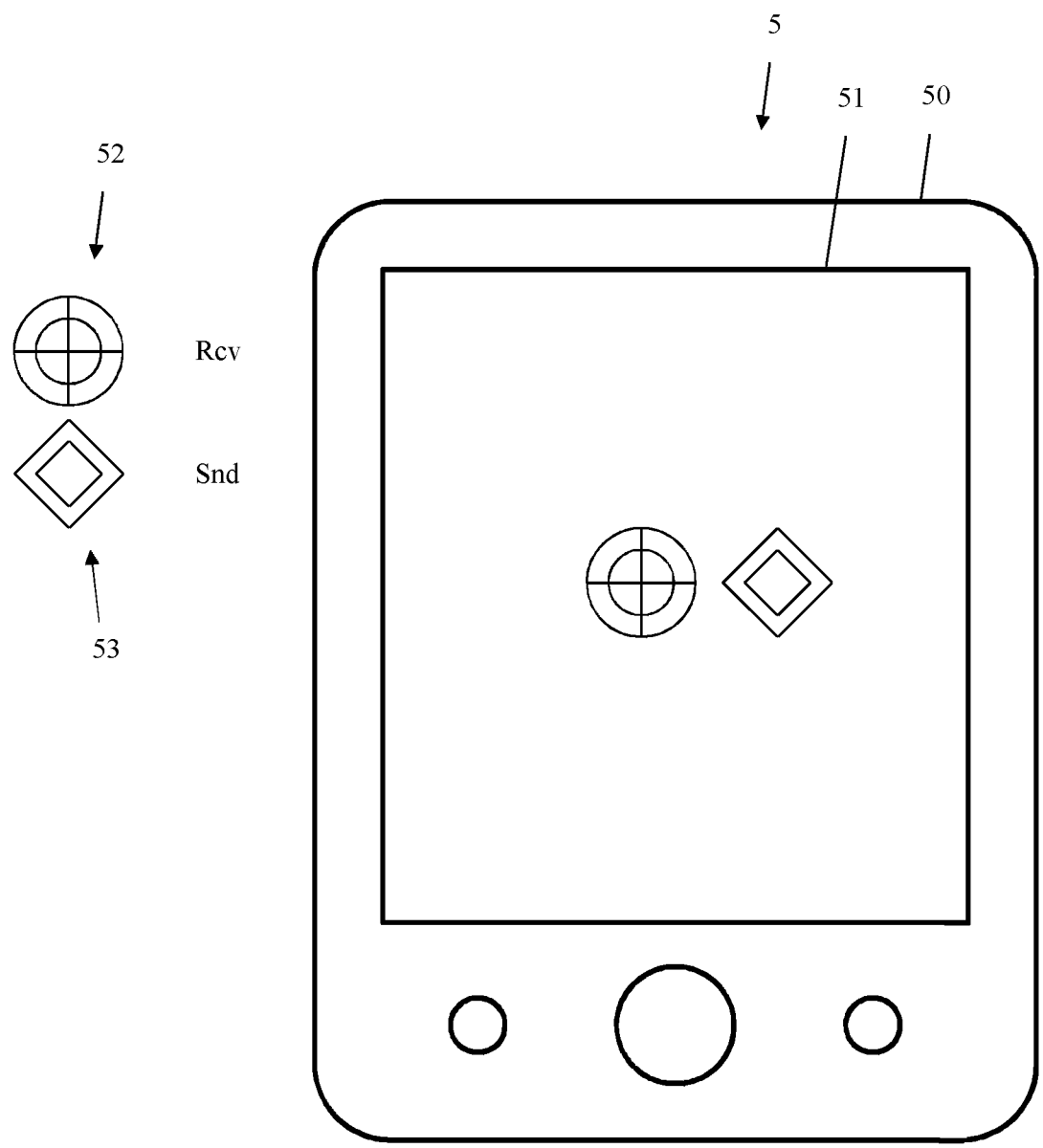
FIG. 7 shows a detail of a seventh embodiment of the communications system.

In FIG. 7, a significantly worse interactivity score is shown by a significant distance between the first symbol 52 and the second symbol 53.

FIG. 5-FIG. 7 have in common that the first symbol 52 and the second symbol 53 are displayed mainly statically on the display. Only the change of distance results in a change of position of the symbols 52, 53.

Figure 8:
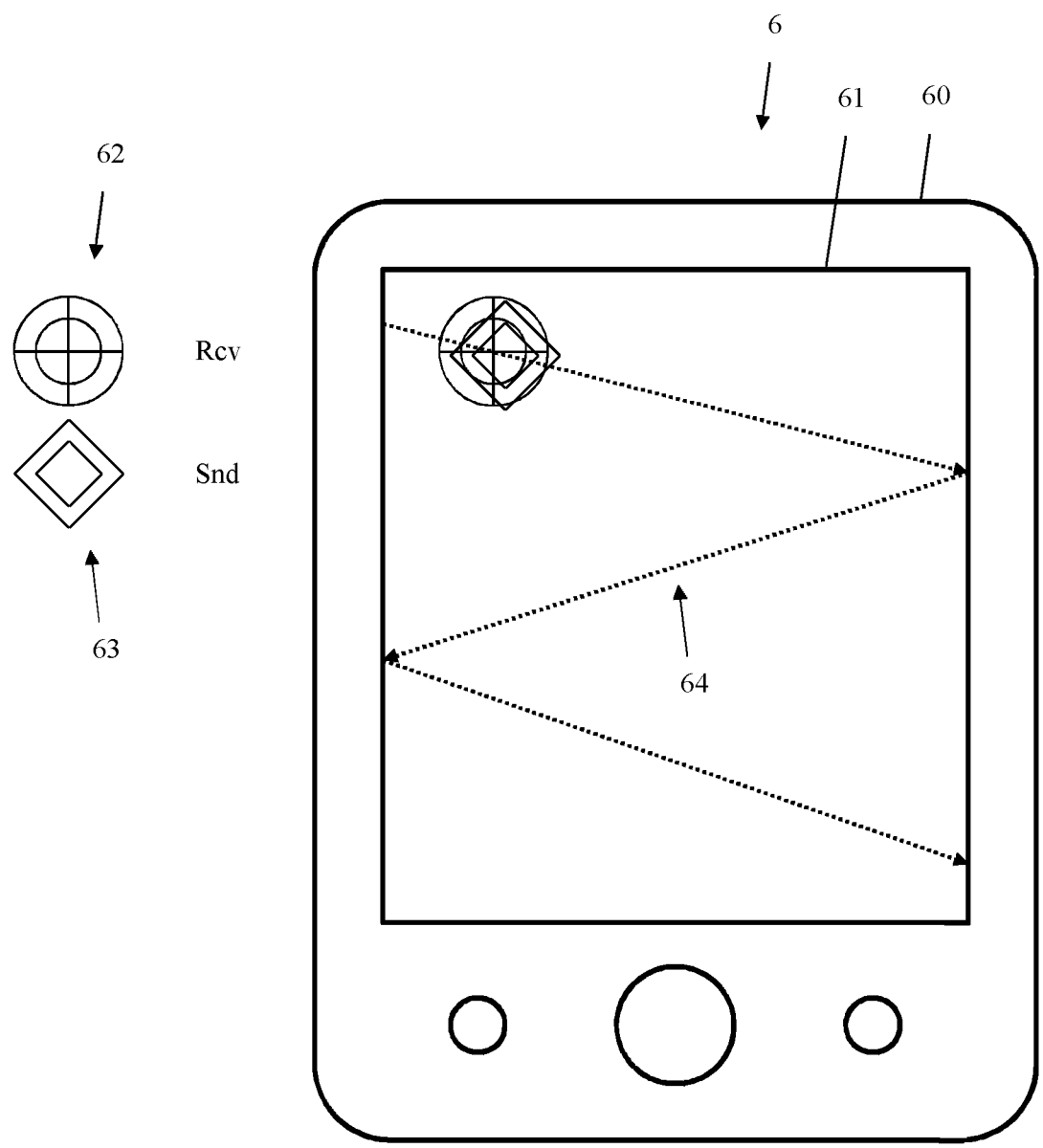
FIG. 8 shows a detail of an eighth embodiment of the communications system.
Figure 9:
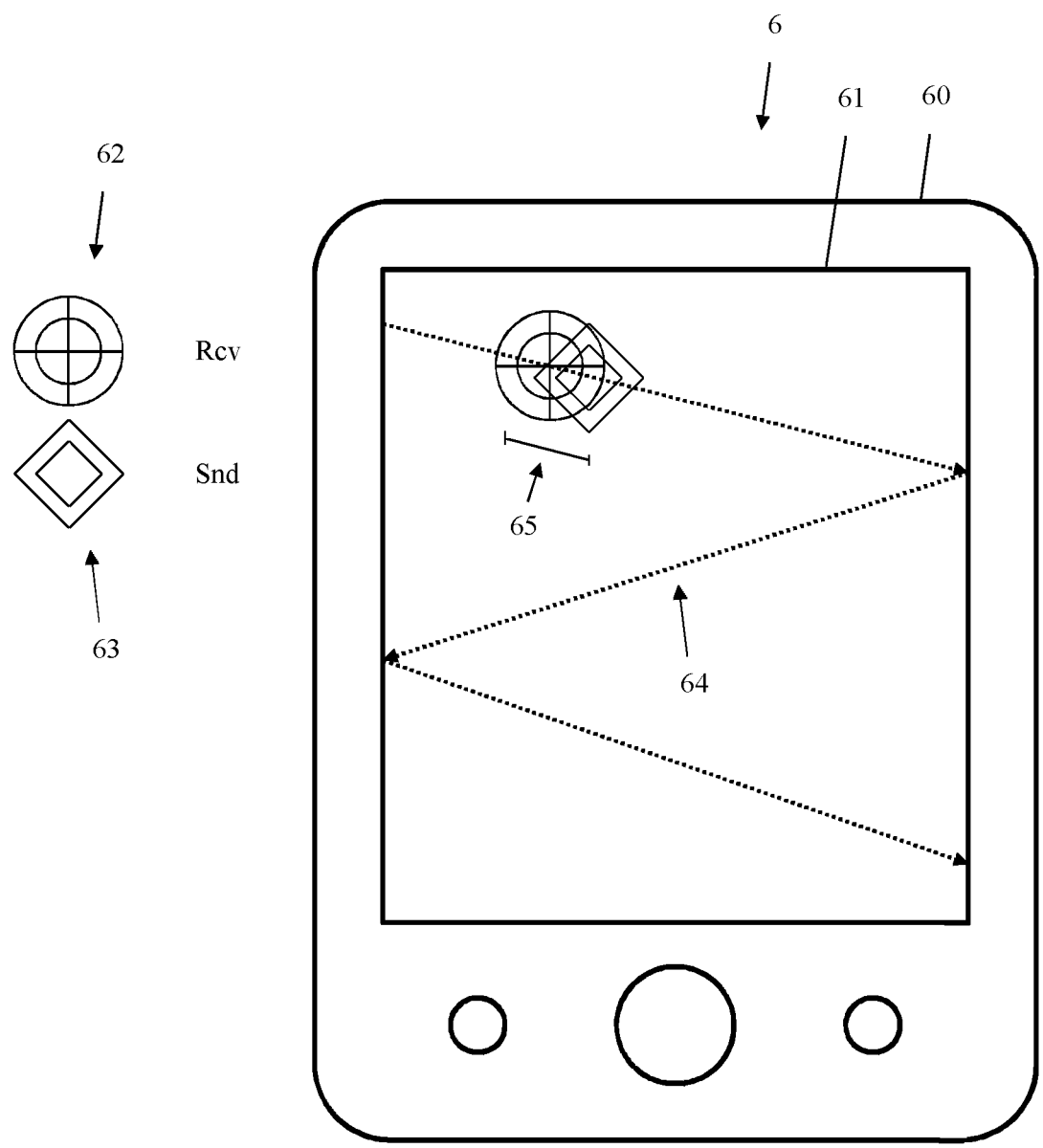
FIG. 9 shows a detail of a ninth embodiment of the communications system.

In FIG. 8, an advantageous approach for showing the interactivity of the communications connection to the user is shown and described. Here, the communications system 6 comprises a first measuring device 60 with a display 61. On the display 61, a first symbol 62, corresponding to the received data packet and a second symbol 63, corresponding to the transmitted data packet is shown. Here, both symbols 62, 63 move along a movement path 64 over the display 61. The symbols 62, 63 move by a movement distance after each update of the interactivity score is calculated after a new pair of data packets has been evaluated. This movement can be seen looking to FIG. 9, where both the first symbol 62 and the second symbol 63 have moved to the lower right on the movement path 64. The distance by which the second symbol 63, corresponding to the transmitted first data packet, has moved is the previously described movement distance. The first symbol 62 is drawn separated by the distance calculated from the interactivity score behind the second symbol 63 on the movement path 64. The movement distance is indicated by the reference number 65. It is drawn significantly below the center of the current position of the second symbol 63 and the position of the second symbol 63 of FIG. 8.

In FIG. 8-FIG. 14, a movement of the first symbol and the second symbol along the movement path is shown. When the end of the movement path is reached, the symbols appear at the beginning of the movement path again.

Figure 10:
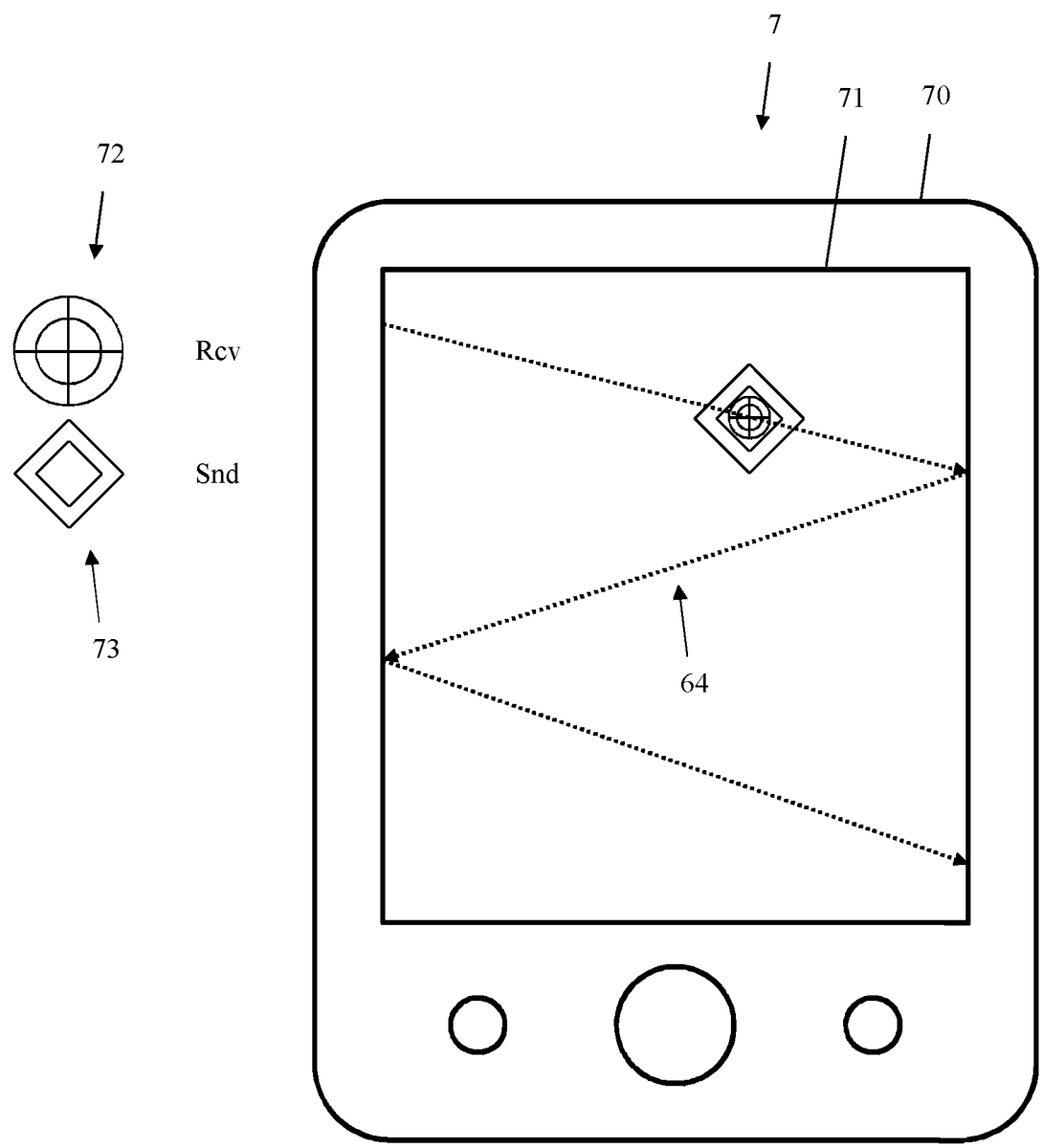
FIG. 10 shows a detail of a tenth embodiment of the communications system.

In FIG. 10, a further embodiment of the measuring system 7 comprising a first measuring device 70, comprising a display 71 is shown. Here, the first symbol has the reference number 72 and the second symbol has the reference number 73. Here, an additional mode of displaying the latency jitter is shown. The first symbol 72, which corresponds to the received second data packet, is displayed in a size, proportional to the jitter of the latency over time. Here, the first symbol is displayed significantly smaller than the second symbol 73. This indicates a low jitter.

Instead of using the size of the symbol to indicate jitter, also the symbol could be displayed with different grades of blurriness. A very sharp outline of the symbol can indicate a very low jitter, while a very blurry outline can indicate a high jitter.

Figure 11:
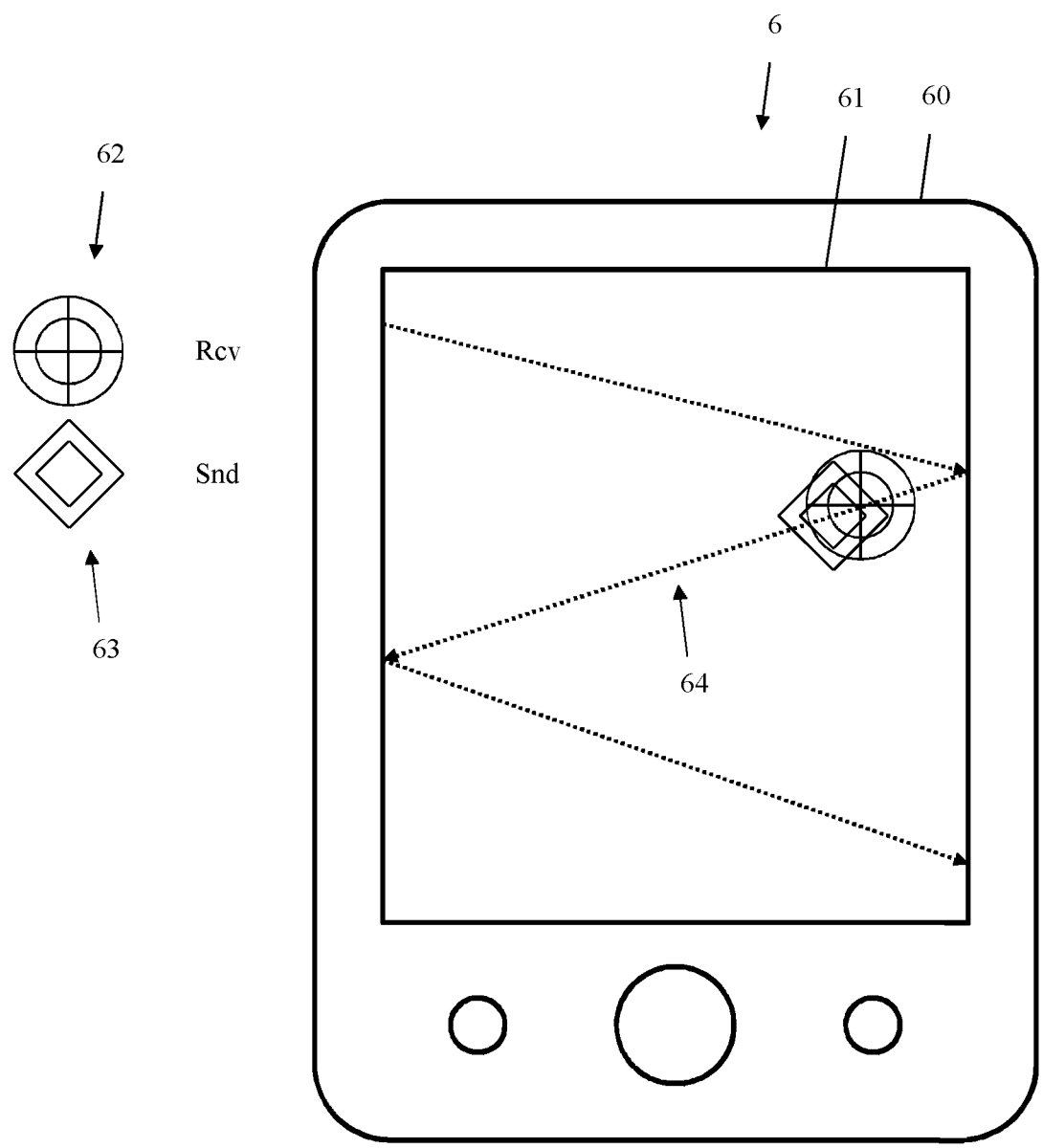
FIG. 11 shows a detail of an eleventh embodiment of the communications system.

Additionally, colors of both symbols or at least one of the symbols can be used for indicating the overall interactivity score like in FIG. 11.

Figure 12:
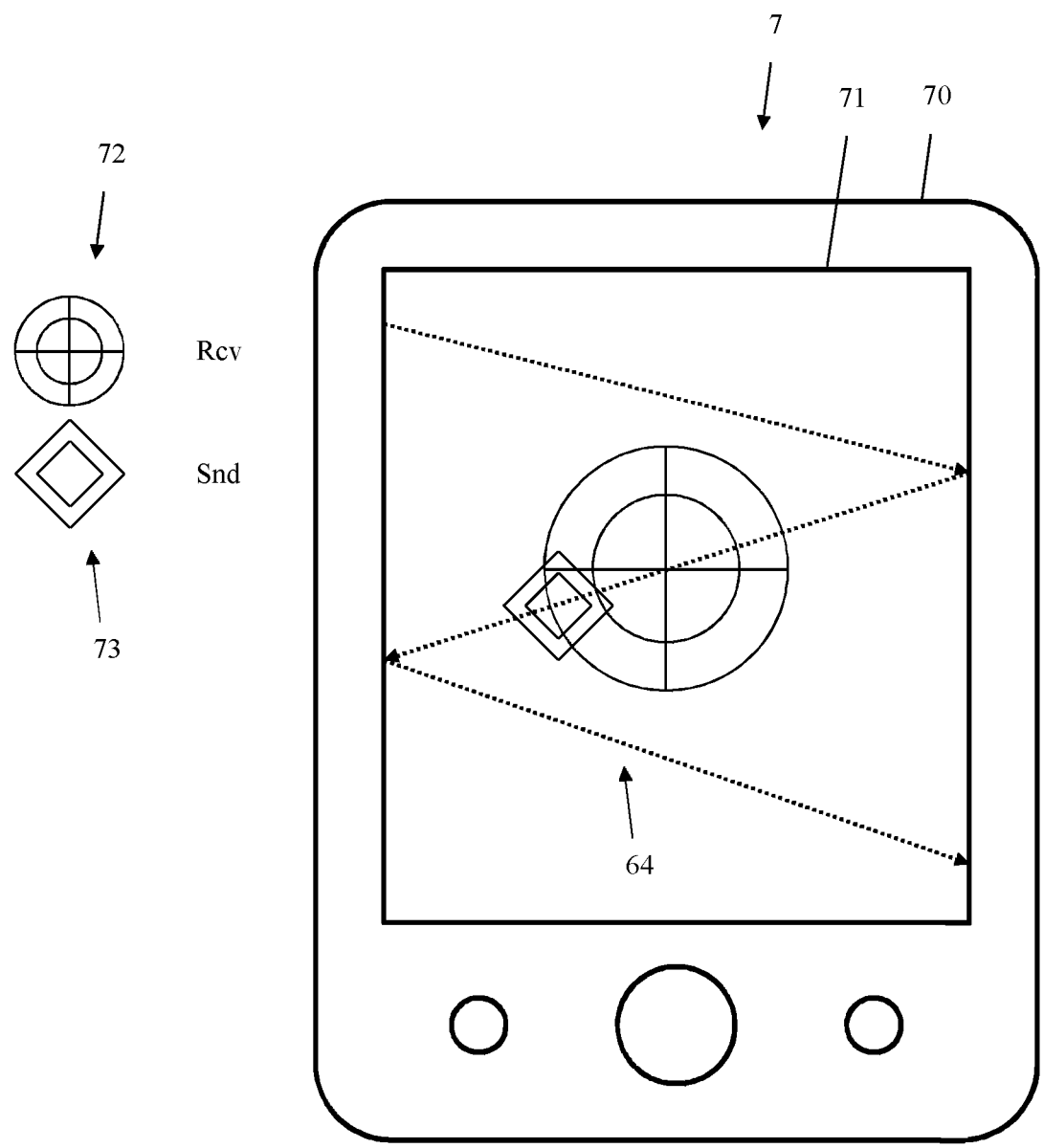
FIG. 12 shows a detail of a twelfth embodiment of the communications system.

In FIG. 12, the opposite situation of a very high jitter is shown. Here, the first symbol 72 is displayed significantly larger than the second symbol 73, indicating a high jitter of the latency.

Figure 13:
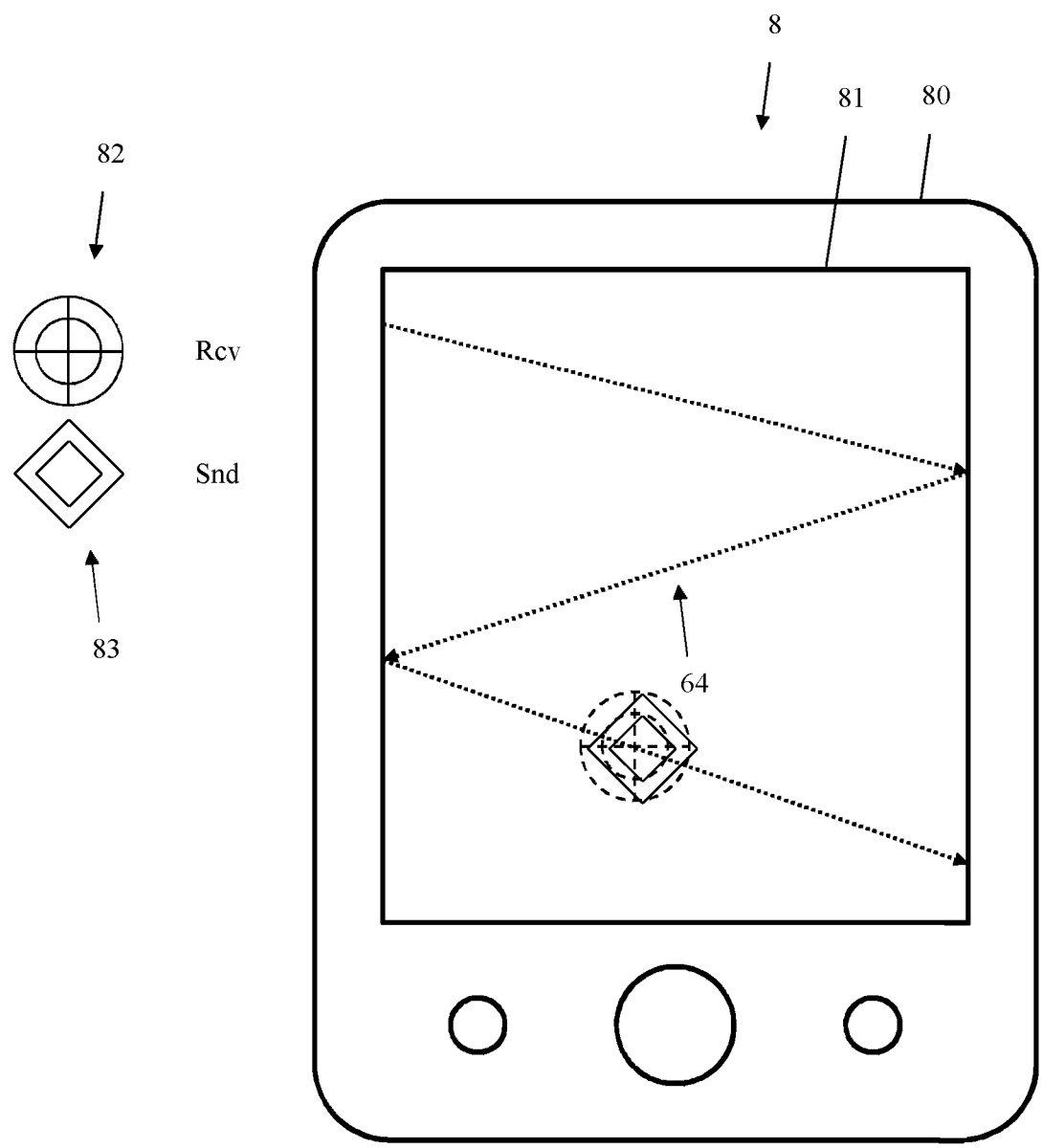
FIG. 13 shows a detail of a thirteenth embodiment of the communications system.
Figure 14:
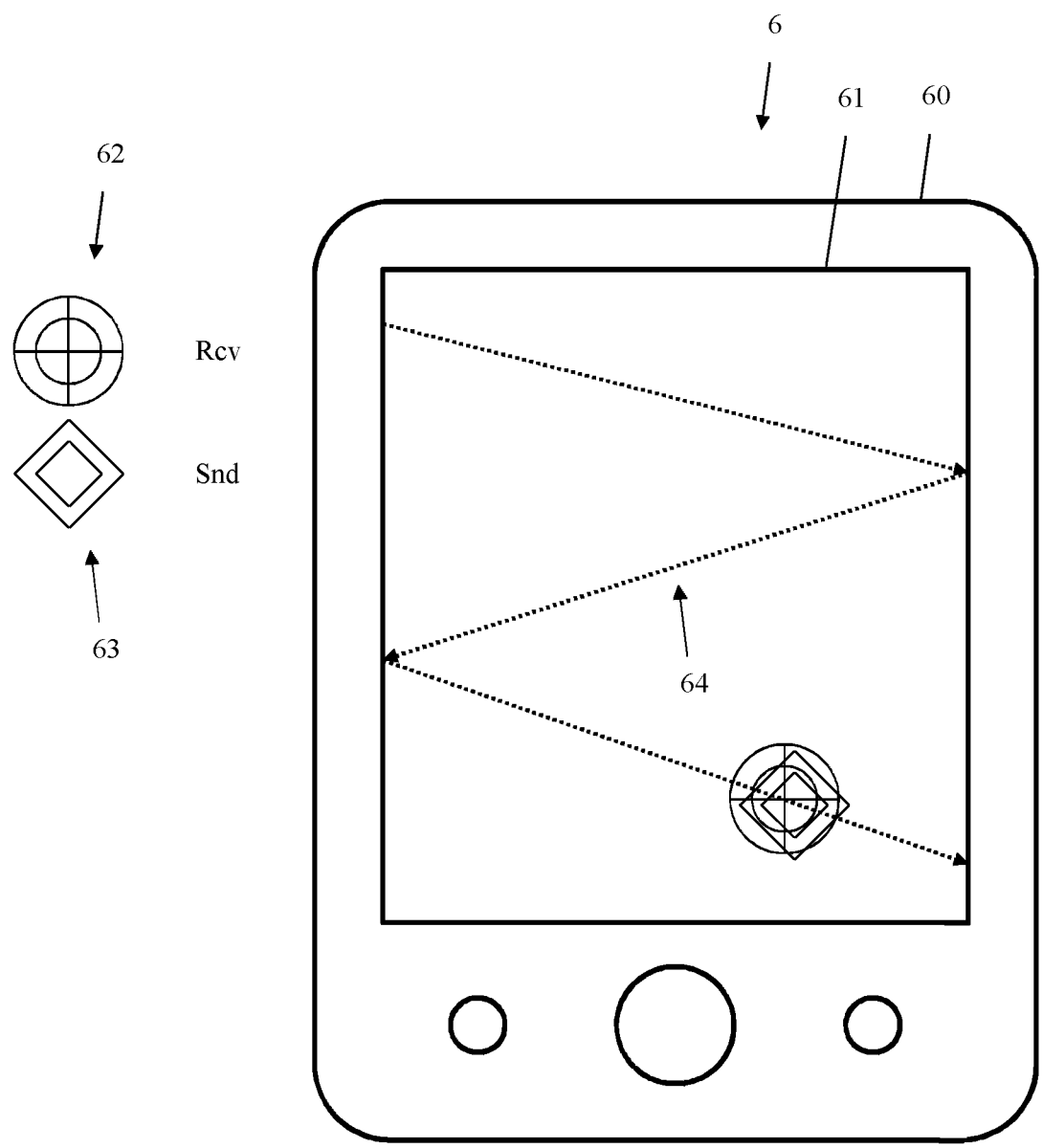
FIG. 14 shows a detail of a fourteenth embodiment of the communications system.

In FIG. 13, a further mode of showing data packet loss is displayed. Here, the measuring system 8 comprises a first measuring device 80 with a display 81. The first symbol 82 corresponds to the received second data packet, while the second symbol 83 corresponds to the transmitted first data packet. Here, the first data packet 82 is displayed in part transparent to indicate a data packet loss rate. The higher the opacity of the first symbol 82 is, the lower the data packet loss rate is. The higher the transparency is, the higher the data packet loss rate is. An alternative to using transparency and opacity to indicate the data packet loss rate is to use different colors, for example green for a low data packed loss rate and red for a high data packet loss rate.

Optionally, as soon as a latency above a latency threshold and/or a jitter above a jitter threshold and/or a data packet loss rate above a data packet loss rate threshold are detected, any of the before-mentioned modes of displaying these parameters is employed for a pre-set or user-definable time period even if the respective parameter returns to below the respective threshold before this time period is passed. This allows a user to recognize problems with the communications connection even if they are of such a short duration, that be would overlook them otherwise.

Also optionally, a gradual recovery from displaying the respective problem with regard to latency jitter or data packet loss rate is possible.

Figure 15:
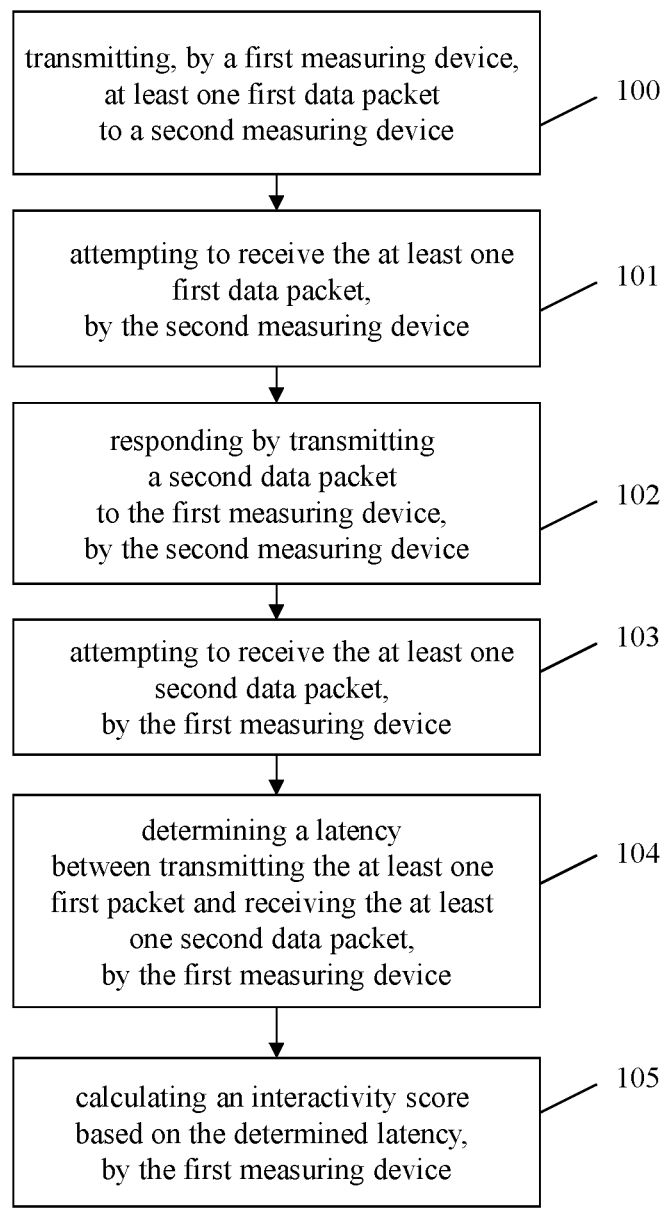
FIG. 15 shows an embodiment of the measuring method in a flow diagram.

Finally, with regard to FIG. 15, an embodiment of the measuring method is shown.

In a first step 100, at least one first data packet is transmitted to a second measuring device by a first measuring device.

In a second step 101, the second measuring device attempts to receive the at least one first data packet.

In a third step 102, the second measuring device responds by transmitting a second data packet to the first measuring device.

In a fourth step 103, the first measuring device attempts to receive the second data packed.

In a fifth step 104, the first measuring device determines a latency between the first data packet and the second data packet.

In a final sixth step 105, an interactivity score is calculated by the first measuring device based upon the determined latency.

It is important to note that the elaborations with regard to the measuring system are also valid with regard to the measuring method, as well as the elaborations regarding the measuring method are also valid with regard to the measuring system.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A measuring system, comprising a first measuring device and a second measuring device,
    wherein the first measuring device comprises a measuring unit, configured to successively transmit at least one first data packet to the second measuring device,
    wherein the second measuring device is configured to:
    attempt to receive the at least one first data packet,
    for each received first data packet, respond by transmitting a second data packet to the first measuring device,
    wherein the first measuring device comprises an interactivity calculator, configured to calculate an interactivity score based on the determined latency,
    wherein the first measuring device comprises a display, wherein the first measuring device is configured to display the interactivity score as a distance between a first symbol and a second symbol on the display, and
    wherein the first measuring device is configured to display the first symbol and the second symbol moving by a movement distance along a movement path over the display at each update of the distance.

2. The measuring system according to claim 1, wherein the measuring unit is configured to:
    attempt to receive the at least one second data packet, and
    determine a latency between transmitting the at least one first data packet and receiving the at least one second data packet,
    wherein the interactivity calculator is configured to calculate the interactivity score as the determined latency.

3. The measuring system according to claim 1,
    wherein the interactivity calculator is configured to calculate the interactivity score by a linear perception function based on the determined latency or by a non-linear perception function based on the determined latency.

4. The measuring system according to claim 1,
    wherein the measuring unit is configured to successively transmit a plurality of first data packets to the second measuring device,
    wherein the second measuring device is configured to attempt to receive the plurality of first data packets,
    wherein the measuring unit is configured to:
    attempt to receive the plurality of second data packets, and
    determine the latency between transmitting each of the plurality of first packets and receiving each corresponding second data packet of the plurality of second data packets, and
    wherein the interactivity calculator is configured to calculate the interactivity score based on the determined latencies.

5. The measuring system according to claim 4,
    wherein the measuring unit is configured to send the first data packets at a data packet frequency, and
    wherein the data packet frequency is pre-defined or user-selectable.

6. The measuring system according to claim 4,
    wherein the interactivity calculator is configured to calculate the interactivity score based on a jitter of the determined latency, and/or based on a data packet loss rate determined by the interactivity calculator as a ratio of transmitted first data packets not resulting in a reception of a corresponding second data packet.

7. The measuring system according to claim 6,
    wherein the first measuring device is configured to display the second symbol at a size, dependent upon the jitter of the determined latency, and/or
    wherein the first measuring device is configured to display the second symbol with a blurriness, dependent upon the jitter of the determined latency, and/or
    wherein the first measuring device is configured to display the second symbol with a transparency, dependent upon the data packet loss rate, and/or
    wherein the first measuring device is configured to display the second symbol with a color, dependent upon the data packet loss rate.

8. The measuring system according to claim 4,
    wherein the first measuring device is configured to update the distance between the first symbol and the second symbol on the display after each transmission of a first data packet and/or after each reception of a second data packet.

9. The measuring system according to claim 1,
    wherein the first measuring device is configured to display the second symbol in a color dependent upon the interactivity score.

10. The measuring system according to claim 1,
    wherein the movement distance is pre-set or user-selectable, and/or
    wherein the movement path is pre-set or user-selectable or directly user-controllable.

11. A measuring method, comprising:
    transmitting, by a first measuring device, at least one first data packet to a second measuring device,
    attempting to receive the at least one first data packet, by the second measuring device,
    responding by transmitting a second data packet to the first measuring device, by the second measuring device,
    attempting to receive the at least one second data packet, by the first measuring device,
    determining a latency between transmitting the at least one first packet and receiving the at least one second data packet, by the first measuring device,
    calculating an interactivity score based on the determined latency, by the first measuring device,
    displaying the interactivity score on a display of the first measuring device as a distance between a first symbol and a second symbol, and
    displaying the first symbol and the second symbol moving by a movement distance along a movement path over the display at each update of the distance.

* * * * *